United States Patent
Tracht

(10) Patent No.: US 8,814,203 B2
(45) Date of Patent: Aug. 26, 2014

(54) SIDE AIR BAG ASSEMBLY FOR VEHICLE SEAT HAVING EXTERNAL RIGID DEFLECTOR SLEEVE

(71) Applicant: Lear Corporation, Southfield, MI (US)

(72) Inventor: Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/855,194

(22) Filed: Apr. 2, 2013

(65) Prior Publication Data

US 2014/0008898 A1    Jan. 9, 2014

(30) Foreign Application Priority Data

Jul. 5, 2012    (DE) .................... 10 2012 211 753

(51) Int. Cl.
    *B60R 21/16*    (2006.01)
(52) U.S. Cl.
    USPC .................................... 280/730.2; 280/728.2
(58) Field of Classification Search
    USPC ............................................ 280/728.2, 730.2
    See application file for complete search history.

(56) References Cited

U.S. PATENT DOCUMENTS

| | | | |
|---|---|---|---|
| 5,498,030 A | 3/1996 | Hill et al. | |
| 5,678,853 A | 10/1997 | Maly | |
| 5,749,597 A | 5/1998 | Saderholm | |
| 5,762,363 A | 6/1998 | Brown et al. | |
| 5,810,389 A * | 9/1998 | Yamaji et al. | 280/730.2 |
| 5,816,610 A | 10/1998 | Higashiura et al. | |
| 5,860,673 A | 1/1999 | Hasegawa et al. | |
| 5,890,734 A | 4/1999 | Saderholm | |
| 5,927,749 A | 7/1999 | Homier et al. | |
| 5,938,232 A | 8/1999 | Kalandek et al. | |
| 5,967,546 A | 10/1999 | Homier et al. | |
| 5,967,603 A | 10/1999 | Genders et al. | |
| 5,992,878 A | 11/1999 | Narita et al. | |
| 5,997,032 A | 12/1999 | Miwa et al. | |
| 6,045,151 A | 4/2000 | Wu | |
| 6,206,410 B1 | 3/2001 | Brown | |
| 6,237,934 B1 | 5/2001 | Harrell et al. | |
| 6,254,122 B1 | 7/2001 | Wu et al. | |
| 6,352,304 B1 | 3/2002 | Sorgenfrei | |
| 6,357,789 B1 | 3/2002 | Harada et al. | |

(Continued)

FOREIGN PATENT DOCUMENTS

| | | |
|---|---|---|
| DE | 69832718 T2 | 10/2006 |
| DE | 102005017395 A1 | 11/2006 |

(Continued)

OTHER PUBLICATIONS

German Office Action Dated Mar. 8, 2013, Applicant Lear Corporation, Application No. 10 2012 211 753.9 (10 Pages).

*Primary Examiner* — Faye M. Fleming
(74) *Attorney, Agent, or Firm* — Brooks Kushman P.C.

(57) ABSTRACT

A vehicle seat air bag assembly (17) has an air bag module (18) including an inflator (38), an air bag (40) and a soft housing (44) enclosing the inflator and air bag. An external rigid deflector sleeve (50) receives an inner extremity (46) of the air bag module (18) and ensures air bag movement toward a deployment location (34) of the seat during inflation. The rigid deflector sleeve (50) may be made from metal, a synthetic resin and may have open ends (52), closed ends (54) or one open end (52) and one closed end (54).

10 Claims, 4 Drawing Sheets

(56) References Cited

U.S. PATENT DOCUMENTS

| | | |
|---|---|---|
| 6,450,528 B1 * | 9/2002 | Suezawa et al. ............ 280/730.2 |
| 6,467,801 B1 | 10/2002 | Preisler et al. |
| 6,588,838 B1 | 7/2003 | Dick, Jr. et al. |
| 7,195,274 B2 | 3/2007 | Tracht |
| 7,284,768 B2 | 10/2007 | Tracht |
| 7,401,806 B2 | 7/2008 | Tracht |
| 7,637,531 B2 | 12/2009 | Paruszkiewicz, Jr. et al. |
| 7,971,900 B2 * | 7/2011 | Lim et al. .................... 280/730.2 |
| 7,992,894 B2 * | 8/2011 | Lim et al. .................... 280/730.2 |
| 8,177,256 B2 * | 5/2012 | Smith et al. ................. 280/730.2 |
| 8,328,231 B2 * | 12/2012 | Nakamura et al. .......... 280/730.2 |

FOREIGN PATENT DOCUMENTS

| | | |
|---|---|---|
| DE | 102006023624 A1 | 11/2007 |
| DE | 102008053080 A1 | 4/2010 |
| DE | 102009021635 A1 | 11/2010 |
| WO | 0009365 A1 | 2/2000 |

* cited by examiner

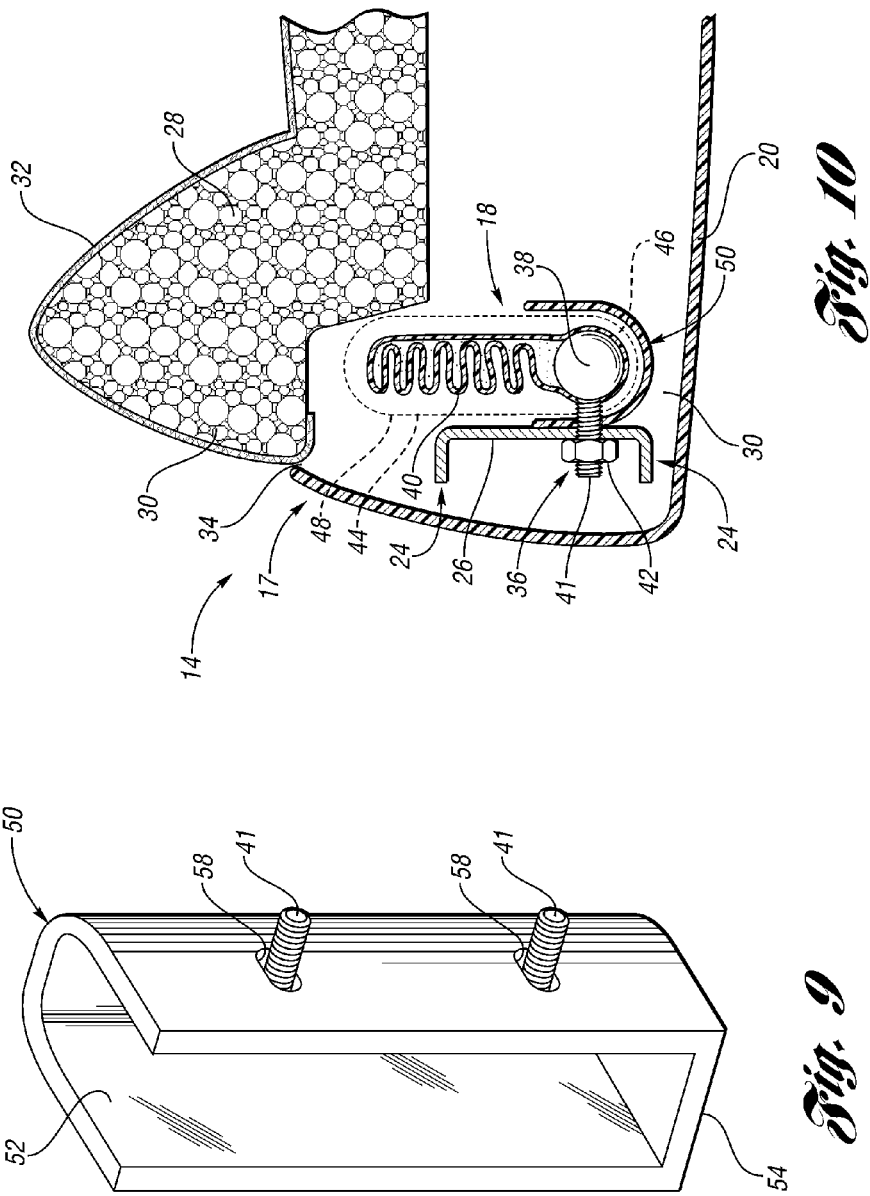

SIDE AIR BAG ASSEMBLY FOR VEHICLE SEAT HAVING EXTERNAL RIGID DEFLECTOR SLEEVE

CROSS-REFERENCE TO RELATED APPLICATIONS

This application claims foreign priority benefits under 35 U.S.C. §119(a)-(d) to DE 10 2012 211 753.9, filed Jul. 5, 2012, the disclosure of which is hereby incorporated by reference in its entirety.

TECHNICAL FIELD

This invention relates to a vehicle seat side air bag assembly having an external rigid deflector sleeve for directing an air bag during deployment.

BACKGROUND

Vehicle seat components have previously included side air bag modules and conventionally include a deployment location through which an air bag upon inflation moves to project outwardly from within the seat and provide occupant protection. The deployment location can be a seam that opens as the air bag inflates or the deployment location can be at the junction of an upholstered seat pad and a trim panel.

Air bags have conventionally included a gas inflator that is received within a stored air bag which can be folded or rolled. A sleeve has conventionally mounted within the air bag around the gas generator to direct the gas toward the deployment location; however, that does not stop some gas from inflating the bag away from the deployment location.

Prior art references noted during an investigation conducted for this invention include U.S. Pat. No. 5,498,030 Hill et al.; U.S. Pat. No. 5,678,853 Maly; U.S. Pat. No. 5,749,597 Saderholm; U.S. Pat. No. 5,810,389 Yamaji et al.; U.S. Pat. No. 5,816,610 Higashiura et al.; U.S. Pat. No. 5,860,673 Hasegawa et al.; U.S. Pat. No. 5,890,734 Saderholm; U.S. Pat. No. 5,927,749 Homier et al.; U.S. Pat. No. 5,938,232 Kalandek et al.; U.S. Pat. No. 5,967,546 Homier et al.; U.S. Pat. No. 5,967,603 Genders et al.; U.S. Pat. No. 5,992,878 Narita et al.; U.S. Pat. No. 5,997,032 Miwa et al.; U.S. Pat. No. 6,045,151 Wu; U.S. Pat. No. 6,206,410 Brown; U.S. Pat. No. 6,237,934 Harrell et al.; U.S. Pat. No. 6,254,122 Wu et al.; U.S. Pat. No. 6,352,304 Sorgenfrei; U.S. Pat. No. 6,467,801 Preisler et al.; U.S. Pat. No. 6,588,838 Dick, Jr. et al; and U.S. Pat. No. 7,637,531 Paruszkiewicz et al.; and also see PCT publication WO 00/09365 A1.

SUMMARY

An object of the present invention is to provide an improved vehicle seat side air bag assembly for providing seat occupant protection.

In carrying out the above object, a vehicle seat side air bag assembly constructed in accordance with the invention includes a vehicle seat having a frame, a foam pad mounted on the frame, a trim cover that covers the foam pad, a back trim panel that encloses the frame, and the trim cover and trim panel of the seat having a junction that defines a deployment location. An air bag module is mounted within the seat on the frame and includes: an inner extremity having a gas generator; a stored air bag in which the gas generator is received, the stored air bag being inflated by the gas generator to move outwardly through the deployment location at the junction of the trim cover and trim panel of the seat to provide vehicle seat occupant protection; and a soft housing in which the inflator and air bag are both received prior to inflation of the air bag. The air bag assembly also includes a rigid deflector sleeve on the frame. The rigid deflector sleeve has a U shape that opens toward the deployment location and receives the inner extremity of the air bag module so as to be external with respect to the soft housing whereby the air bag is directed by the rigid deflector sleeve toward the deployment location upon inflation to provide the seat occupant protection.

As disclosed, the rigid deflector sleeve is made from metal or a synthetic resin.

One embodiment of the rigid deflector sleeve has open ends, another embodiment of the rigid deflector sleeve has closed ends, and a further embodiment of the rigid deflector sleeve has one open end and one closed end.

The air bag module as disclosed includes threaded studs that mount the air bag module on the frame of the seat and that also secure the rigid deflector sleeve to the frame. As disclosed, the studs are mounted on the gas generator, and the rigid deflector sleeve has stud openings through which the studs extend.

The seat disclosed has opposite lateral sides and the air bag module and rigid deflector sleeve are mounted on the frame at one of the lateral sides of the seat. It is also possible to optionally have a second air bag module and deflector sleeve mounted on the frame at the other lateral side of the seat and of the same construction as the first mentioned air bag module and deflector sleeve in a symmetrical relationship.

The air bag module may be mounted on the lateral inner side of the associated seat frame member or on its lateral outer side within the seat.

The vehicle seat air bag assembly as disclosed is mounted within a vehicle seat back of a vehicle seat on a frame of the vehicle seat back.

The objects, features and advantages of the present invention are readily apparent from the following detailed description of the preferred embodiments when taken in connection with the accompanying drawings.

BRIEF DESCRIPTION OF THE DRAWINGS

FIG. 9 is a perspective view of a further embodiment of the deflector which has one open end and one closed end.

FIG. 10 is a partial view similar to FIG. 4 of a further embodiment in which the deflector sleeve and air bag module are mounted on the lateral inner side of the associated seat frame member.

DETAILED DESCRIPTION

Figure 1:
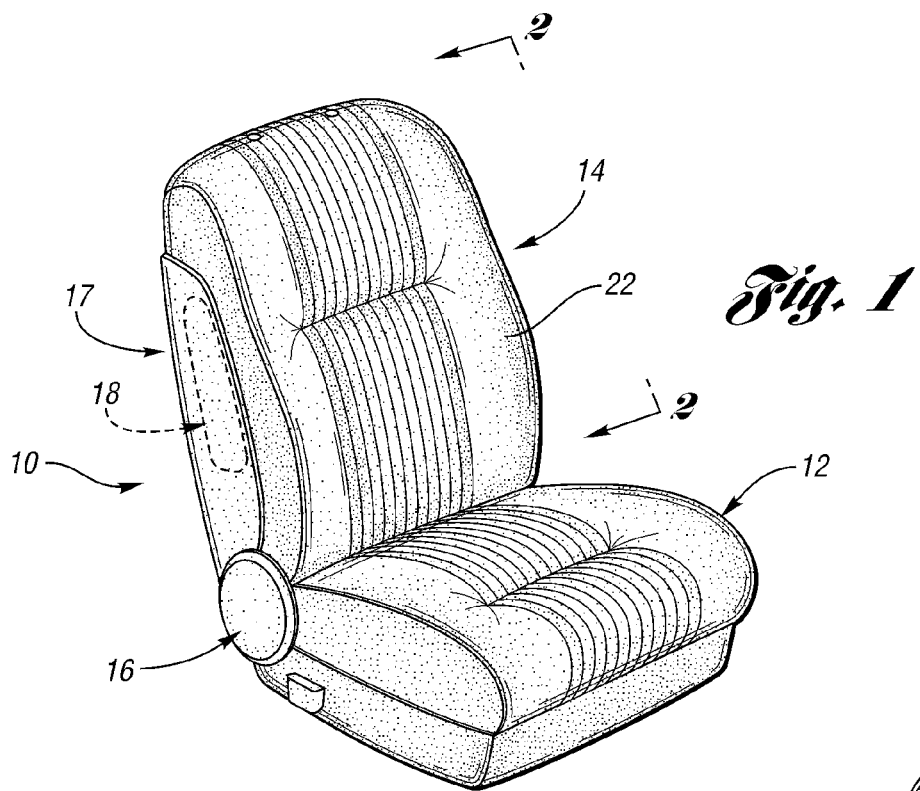
FIG. 1 is a perspective view of a vehicle seat side air bag assembly including a seat back component constructed in accordance with the invention to include a side air bag module that is shown by hidden line illustration.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag assembly 17 that is constructed in accordance with the present invention and includes a side air bag module 18 operable to provide seat occupant protection as is hereinafter more fully described. While the side air bag module 18 is shown on the seat back 14, which is a usage for which it has particular utility, it is also possible for the side air bag module to be utilized with a seat bottom 12 even though the seat back usage is specifically disclosed. As illustrated, the side air bag module 18 is located at a lateral outer side or extremity of the seat to provide protection against adjacent vehicle structure. It is also possible to optionally have another side air bag module 18' as shown by phantom line representation at the lateral inner side or extremity of the seat to provide protection against an adjacent vehicle occupant. Both of the air bag modules 18 and 18' have the same construction, except for being symmetrical about the longitudinal vertical center plane of the seat, such that only one will be described.

Figure 2:
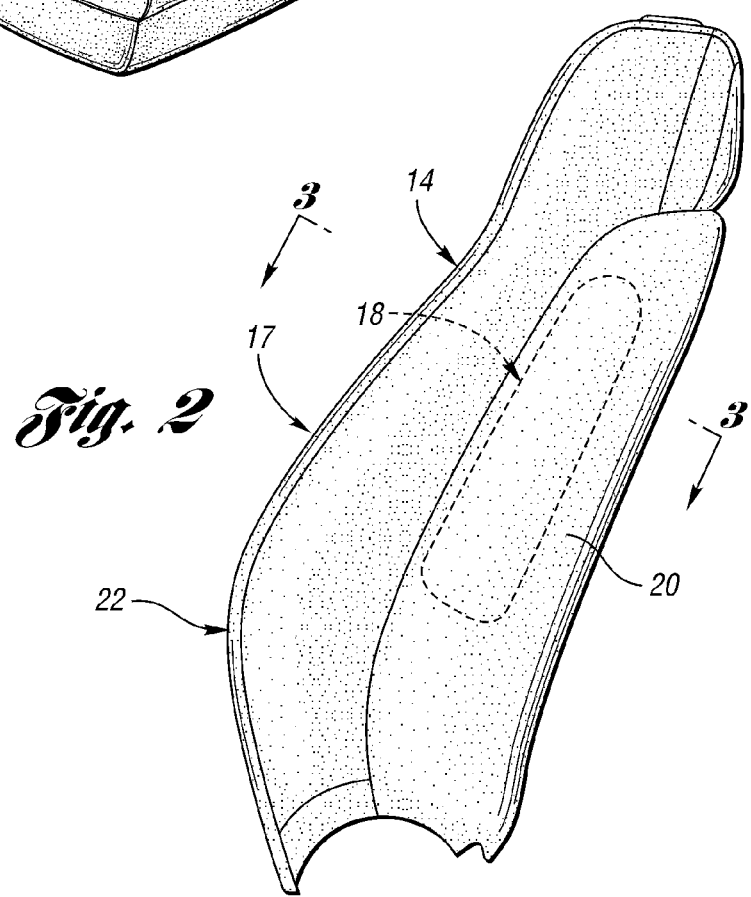
FIG. 2 is a side elevational view of the vehicle seat back component taken along the direction of line 2-2 in FIG. 1 with the side air bag module thereof also illustrated by hidden line representation.
Figure 3:
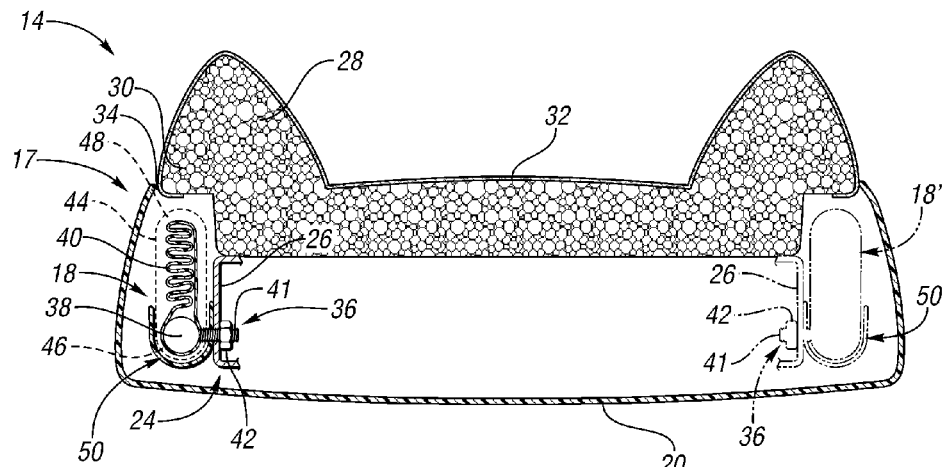
FIG. 3 is a sectional view taken along the direction of line 3-3 in FIG. 2 to illustrate the manner in which the air bag module is mounted within the seat and to also illustrate an external rigid deflector sleeve that receives an inner extremity of the air bag module to direct the air bag upon inflation for deployment.

As shown in FIGS. 2 and 3, the seat back 14 includes a back trim panel 20 that is conventionally molded from plastic that may include a wood composite, and the seat back also includes a front cushion 22 against which the seat occupant leans to provide back support and in which the side air bag modules 18 are located.

As illustrated in FIG. 3, the seat back component 14 includes a frame collectively identified by 24 and having a pair of frame members 26 at its opposite lateral sides. The frame 24 is enclosed by the back trim panel 20 at the back side of the seat. The front cushion 22 includes a foam pad 28 that is mounted on the frame 24 in any conventional manner and that has opposite side extremities 30 spaced laterally from each other at the opposite lateral sides of the seat. A trim cover generally indicated by 32 extends over the front exposed portion of the foam pad 28. The trim panel 20 and the trim cover 32 over the foam pad 28 have a junction that defines a deployment location 34 for the air bag module 18 as is hereinafter described.

The side air bag module 18 is located within the seat and mounted on the frame 24, specifically by a threaded connection 36 on the associated side frame member 26 adjacent the deployment location 34 but in an inwardly spaced relationship within the seat from the deployment location 34. The air bag module 18 has an inner extremity including a gas generator 38 and a schematically illustrated stored air bag 40 which may be folded or rolled. The air bag 40 receives the gas generator 38 and is located toward the deployment location 34 of the seat from the gas generator 38. Upon deployment, the air bag 40 is inflated by the gas generator 38 and projected outwardly from the seat through the deployment location 34 at the junction of the trim panel 20 and trim cover 32 of the seat.

Cloth, vinyl or leather, etc. may be used to fabricate the trim cover 32. The threaded connection 36 includes a pair of threaded studs 41 (shown in FIGS. 5 and 6) each of which extends through the frame 24 as shown in FIG. 3 and receives an associated nut 42 on the opposite side of the frame to provide the mounting of the air bag module 18.

Each air bag module as shown in FIG. 3 includes a soft housing 44 that may be made of nonwoven cloth or a flexible sheet such as of a soft plastic material. The soft housing 44 receives the gas generator 38 and the air bag 40 as shown in FIG. 3 prior to the deployment and air bag inflation. The air bag module 18 has an inner extremity 46 adjacent the gas generator 38 and an outer extremity 48 positioned toward the deployment location 34 from the inflator. At its outer extremity 48, the soft housing 44 either has an opening or a location that ruptures to allow the air bag 40 to inflate and move out of the seat through the deployment location 34.

An external rigid deflector sleeve 50 of the side air bag module 18 is shown mounted on the frame 24 and has a U-shape that opens toward the deployment location 34. The rigid deflector sleeve 50 receives the inner extremity 46 of the associated air bag module 18 and is thus external with respect to the air bag module so as to direct the air bag upon inflation toward the deployment location 34 for movement therethrough outwardly out of the seat to provide the occupant protection. It is also possible for the deflector sleeve 50 to be made as part of the frame rather than as a separate component mounted on the frame. As shown, the stud 41 of the threaded connection 36 extends from the gas generator 38, but it can also extend from the deflector sleeve 50 with another threaded or other connection mounting the gas generator on the deflector sleeve.

Figure 5:
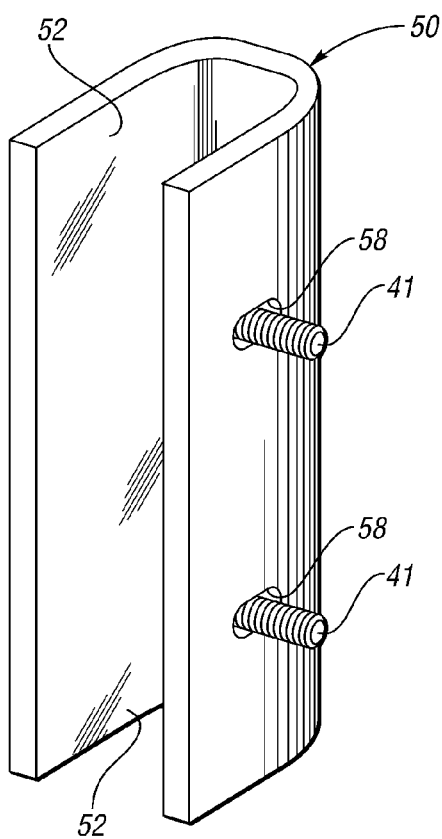
FIG. 5 is a perspective view illustrating one embodiment of the external deflector sleeve that receives the inner extremity of the air bag module to direct air bag inflation toward a deployment seam associated with the air bag module and having open ends which are at upper and lower locations when used with the seat back as illustrated.
Figure 6:
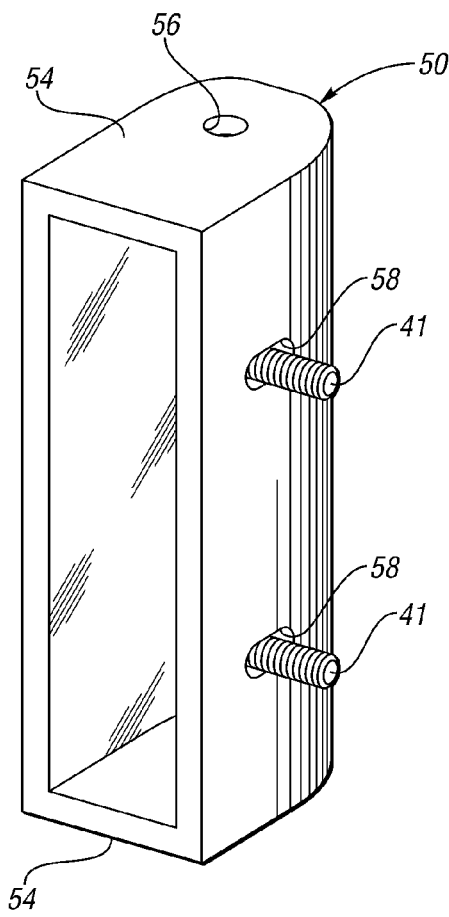
FIG. 6 is a perspective view of another embodiment of the internal deflector sleeve that has closed ends.
Figure 7:
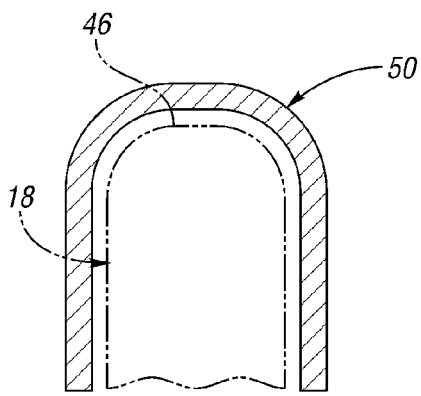
FIG. 7 is a cross sectional view through either embodiment of the deflector sleeve showing that it can be made from metal.
Figure 8:
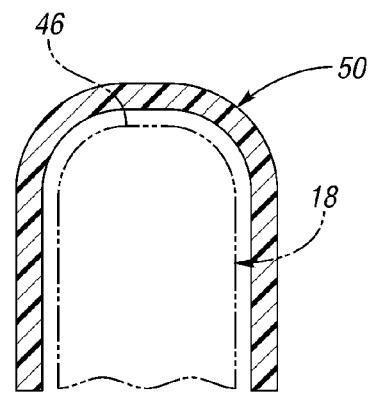
FIG. 8 is a cross sectional view of either embodiment of the sleeve showing that it can also be made from a synthetic resin.

The U-shaped rigid deflector sleeve 50 may have open ends 52 as shown in FIG. 5, closed ends 54 as shown in FIG. 6, or one open end 52 and one closed end 54 as shown in FIG. 9. A hole 56 may be provided in one of the closed ends 54 to receive wiring that controls the air bag module deployment. Furthermore, the rigid deflector sleeve 50 may be made from metal as shown in FIG. 7 or from a synthetic resin that is a rigid plastic as shown in FIG. 8. A stamping operation on sheet metal can be utilized to provide the open ended embodiment of the rigid deflector sleeve 50 shown in FIG. 5, while a molding operating can be utilized to provide the FIG. 6 or FIG. 9 embodiment of the rigid deflector sleeve when it is made from plastic.

The studs 41 shown in FIGS. 5 and 6 extend through stud openings 58 of each embodiment of the rigid deflector sleeve 50 and as illustrated have elongated shapes that permit adjustment of the location of the rigid deflector sleeve which is clamped between the frame member 26 and the air bag module 18 upon assembly as best illustrated in FIG. 3.

Figure 4:
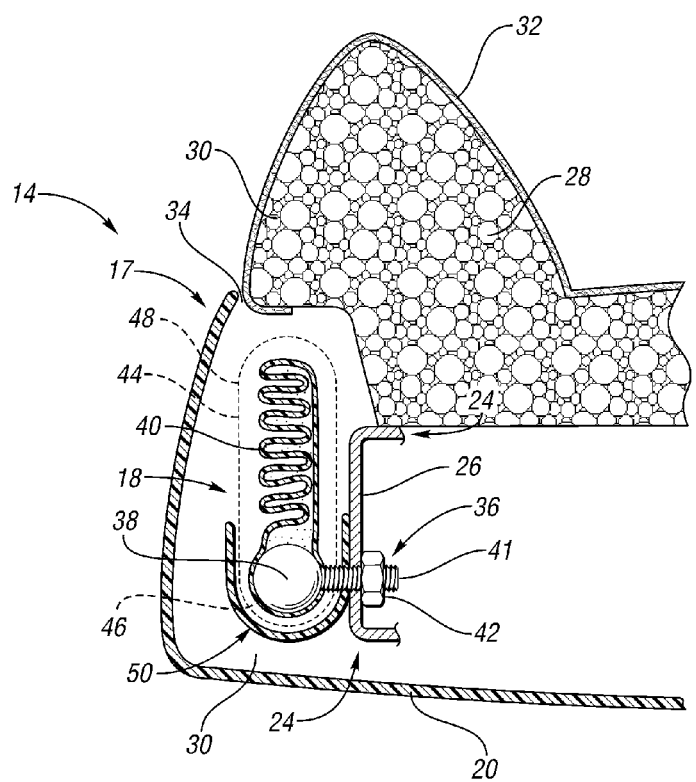
FIG. 4 is an enlarged view of a portion of FIG. 3 but taken at an enlarged scale to illustrate the construction of the air bag assembly.

The air bag module 18, in addition to being mounted on the lateral outer side of the frame member 26 as shown in FIG. 4, can also be mounted on the lateral inner side of the frame member 26 as shown in FIG. 10.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A vehicle seat side air bag assembly comprising:
a vehicle seat having a frame, a foam pad mounted on the frame, a trim cover that covers the foam pad, a back trim panel that encloses the frame, and the trim cover and trim panel of the seat having a junction that defines a deployment location;
an air bag module mounted within the seat and including an inner extremity having a gas generator, a stored air bag in which the gas generator is received, the stored air bag being inflated by the gas generator to move outwardly through the deployment location at the junction of the trim cover and trim panel of the seat to provide vehicle seat occupant protection, and a soft housing in which the gas generator and the stored air bag are both received prior to inflation of the air bag; and
a rigid deflector sleeve on the frame and having a U shape that opens toward the deployment location, the rigid deflector sleeve having closed ends, and the inner extremity of the air bag module being received within the U shape of the rigid deflector sleeve whereby the air bag is directed by the rigid deflector sleeve toward the deployment location upon inflation to provide its movement therethrough to provide the seat occupant protection.

2. A vehicle seat side air bag assembly as in claim 1 wherein the rigid deflector sleeve is made from metal.

3. A vehicle seat side air bag assembly as in claim 1 wherein the rigid deflector sleeve is made from a synthetic resin.

4. A vehicle seat side air bag assembly as in claim 1 wherein rigid deflector sleeve has open ends.

5. A vehicle seat side air bag assembly comprising:
a vehicle seat having a frame, a foam pad mounted on the frame, a trim cover that covers the foam pad, a back trim panel that encloses the frame, and the trim cover and trim panel of the seat having a junction that defines a deployment location;
an air bag module mounted within the seat and including an inner extremity having a gas generator, a stored air bag in which the gas generator is received, the stored air bag being inflated by the gas generator to move outwardly through the deployment location at the junction of the trim cover and trim panel of the seat to provide a vehicle seat occupant protection and a soft housing in which the gas generator and the stored air bag are both received prior to inflation of the air bag; and
a rigid deflector sleeve on the frame and having a U shape that opens toward the deployment location, the rigid deflector sleeve having one open end and one closed end, and the inner extremity of the air bag module being received by the U shape of the rigid deflector sleeve whereby the air bag is directed by the rigid deflector sleeve toward the deployment location upon inflation to provide its movement therethrough to provide the seat occupant protection.

6. A vehicle seat side air bag assembly as in claim 1 wherein the air bag module includes threaded studs that mount the air bag module on the frame of the seat and that also secure the rigid deflector sleeve to the frame.

7. A vehicle seat side air bag assembly as in claim 6 wherein the studs are mounted on the gas generator of the air bag module, and the rigid deflector sleeve having stud openings through which the studs extend.

8. A vehicle seat side air bag assembly as in claim 6 wherein the threaded studs mount the air bag module on a lateral outer side of a frame member of the frame of the seat.

9. A vehicle seat side air bag assembly as in claim 6 wherein the threaded studs mount the air bag module on a lateral inner side of a frame member of the frame of the seat.

10. A vehicle seat side air bag assembly comprising:
a vehicle seat having opposite lateral sides and an air bag module and a rigid deflector sleeve mounted on the frame at each lateral side of the seat and the air bag module and rigid deflector sleeve at each lateral side of the seating having the same constructions as each other, and the seat having a frame, a foam pad mounted on the frame, a trim cover that covers the foam pad, a back trim panel that encloses the frame, and the trim cover and trim panel of the seat having a junction that defines a deployment location;
each air bag module being mounted within the seat and including an inner extremity having a gas generator, a stored air bag in which the gas generator is received, the stored air bag being inflated by the gas generator to move outwardly through the deployment location at the junction of the trim cover and trim panel of the seat to provide vehicle seat occupant protection, and a soft housing in which the gas generator and the stored air bag are both received prior to inflation of the air bag; and
each rigid deflector sleeve on the frame and having a U shape that opens toward the deployment location and receives the inner extremity of the air bag module whereby the air bag is directed by the rigid deflector sleeve toward the deployment location upon inflation to provide its movement therethrough to provide the seat occupant protection.

* * * * *